United States Patent

[11] 3,589,344

[72] Inventor Leo Steinke
 Hegnach, Germany
[21] Appl. No. 797,458
[22] Filed Feb. 7, 1969
[45] Patented June 29, 1971
[73] Assignee Robert Bosch G.m.b.H.
 Stuttgart, Germany
[32] Priority Feb. 16, 1968
[33] Germany
[31] P 16 01 365.3

[54] FUEL INJECTION ARRANGEMENT FOR INTERNAL COMBUSTION ENGINES
 9 Claims, 6 Drawing Figs.
[52] U.S. Cl. .................................................. 123/8.09,
 123/21, 418/61
[51] Int. Cl. ....................................................... F02b 53/12
[50] Field of Search .......................................... 123/21, 32,
 32 E, 73 O, 97 B, 119, 139, 140.3, 198 F, 102,
 111, 112

[56] References Cited
 UNITED STATES PATENTS
 2,444,440 7/1948 Grieshaber et al. ............ 123/21 X
 3,100,478 8/1963 Crooks ........................... 123/21
 3,424,136 1/1969 Hamada ......................... 123/119 X
 3,430,616 3/1969 Glockler et al. ................ 123/32 E-1

Primary Examiner—Laurence M. Goodridge
Attorney—Michael S. Striker

ABSTRACT: An arrangement in which fuel is inhibited from being injected into the combustion chamber of an internal combustion engine when the engine is operated at idling speed or low load conditions. Fuel is injected into the engine through an electromagnetically controlled fuel injection valve which is opened by an electrical pulse during the fuel injection process. Electrical pulses from a pulse emitter are inhibited by a gating circuit for at least every second fuel injection process when the engine is at idling speed or driving a substantially small load. The operating state of the engine is automatically established through a pressure sensing device within the air intake manifold of the engine. The pressure-sensing device actuates the gating circuitry when the pressure within the air intake manifold is within a predetermined pressure region.

PATENTED JUN29 1971   3,589,344
FIG.1
FIG.2
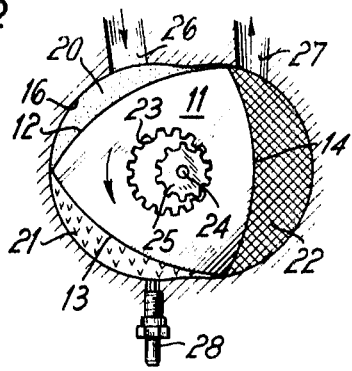
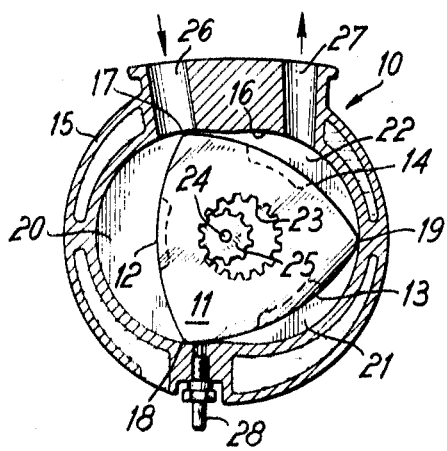
FIG.3
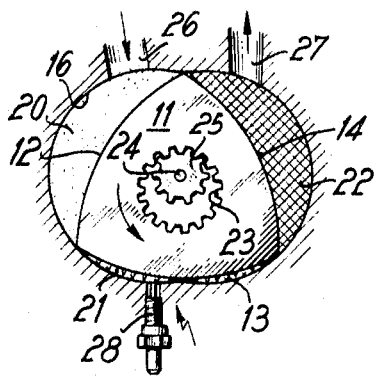
FIG.4
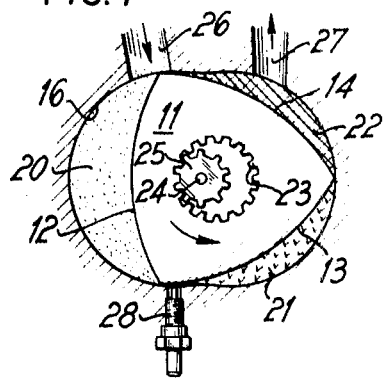
FIG.5
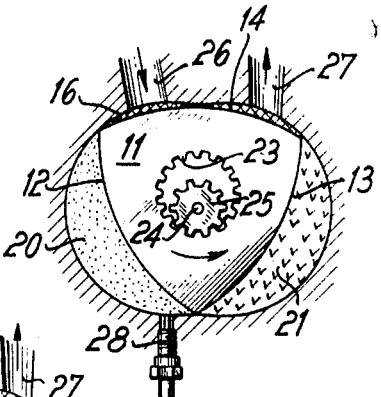
FIG.6
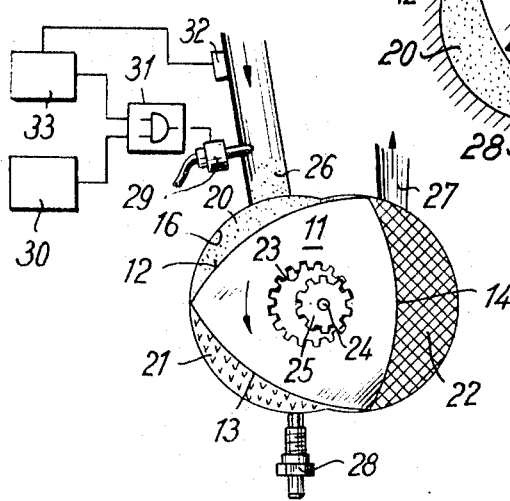
INVENTOR:
Leo STEINKE
By Michael S. Striker
his ATTORNEY

FUEL INJECTION ARRANGEMENT FOR INTERNAL COMBUSTION ENGINES

BACKGROUND OF THE INVENTION

The present invention resides in an arrangement in which fuel is injected through an electronic actuating arrangement into a combustion chamber of an internal combustion engine, as a function of the angular position of a driving shaft.

In combustion engines of the preceding species, particularly in rotational or turning piston internal combustion engines, it is difficult to realize complete combustion of the fuel-air mixture when the engine is operated in idling condition.

This disadvantage is avoided in the present invention by suppressing every second injection process. Thus, instead of injecting fuel at each injection process, fuel is inhibited from being injected into the air during at least every second injection process so that only fresh air reaches the combustion chamber, rather than a fuel-air mixture. This fresh air intake is used to scavenge or cleanse the combustion chamber of the engine. This suppression of a fuel injection process is performed only for idling conditions of the engine for low load operating conditions.

Inhibiting arrangements for power control of internal combustion engines are known in the art. In the present invention, however, the lowest possible idling speed of the engine is maintained at a stable state through simultaneous lowering of the exhaust gas emission of the internal combustion engine.

SUMMARY OF THE INVENTION

An internal combustion engine in which a movable piston of the rotatable type forms a combustion chamber into which air is taken during a combustion cycle of the engine. An electromagnetically operating fuel injection valve is opened through an electrical impulse forcing fuel into the chamber and to be mixed with the air therein. The fuel is injected so that a finely divided spray becomes readily intermixed with the air, so as to form a fuel-air mixture satisfactory for ignition. When idling of the engine prevails and the amount of fuel-air mixture taken into the combustion chamber is small in quantity when compared to the residual exhaust gases remaining within the chamber from the previous cycle, a pulse inhibiting circuit is actuated to prevent fuel injection for at least every second injection cycle. Thus, during idling condition or low load operation of the engine, pulse transmission to the fuel injection valve is prevented or inhibited for every second injection process. The remaining fresh air within the combustion chamber, thereby, serves to scavenge the chamber and cleanse the latter. The scavenging or cleansing operation is accomplished by the condition that the amount of residual exhaust gases within the combustion chamber is small compared to the amount of fresh air taken into the chamber and not intermixed with fuel. By diluting the residual gases in this manner, a combustion chamber becomes cleansed preparatory for the next combustion cycle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a sectional diagram showing the principle operation of a rotary piston type of internal combustion engine, in accordance with the present invention;

FIGS. 2 to 5 are diagrammatic views of the internal combustion engines of FIG. 1, and show different operating phases during the operation of the engine; and FIG. 6 is a functional schematic diagram and shows the manner in which the fuel injection valve of the engine is controlled so as to inhibit fuel injection while the engine is in idling operating state.

DESCRIPTION OF THE PREFERRED EMBODIMENTS

Referring to the drawing and in particular to FIG. 1, the piston 11 of a rotational piston internal combustion engine 10 has a cross section in the form of a triangular structure with convex piston edges or sides 12, 13 and 14. The piston moves within a water-cooled housing 15 having an inner wall 16 of oval shape with a necked-down center so as to form an epitrochoid. The three corners 17, 18 and 19 of the piston 11 contact at all times the trochoid-shaped wall 16 within the housing 15. The arrangement is such during operation, that three operating chambers displaced 120° from each other and sealed in relation to each other, are periodically generated with respect to the piston edges 12, 13 and 14, respectively. These operating chambers 20, 21 and 22 become periodically smaller and larger while the piston rotates or turns within the housing 15. During a single rotation of the piston 11, a four-cycle operating process is carried out in each one of the spaces 20, 21 and 22.

An internal gear 23 is cut into the piston 11 and concentric with the axis of the piston. A driving shaft 24 is eccentrically displaced from the axis of the piston 11, and held or mounted within the opening of the internal gear 23. A gear or pinion 25 is concentrically mounted upon the shaft 24 and securedly fixed in relation to the housing 15. The internal gear 23 rolls, in operation, upon the pinion 25. The air-fuel mixture required for operating the internal combustion engine is provided through an electromagnetically actuated injection valve which communicates with the suction or intake manifold. While in power, operation or drive, the electromagnetically actuated injection valve has applied to it electrical pulses for opening the valve three times during each rotation of the driving shaft 24. During the interval of the pulse, the fuel is emitted to the injection valve at constant pressure and in finely distributed form. After being emitted from the ejection valve in this form, the fuel is intermixed with the sucked-in air which is taken in through the entrance opening 26. The burned gases or exhaust gases are ejected through the exit or exhaust opening 27. The emission of the fuel-air mixture is accomplished through a spark plug 28.

The injection valve 29 of the electromagnetic type has opening pulses applied to it through electronic control circuitry which may be in the form of any one of numerous available designs known in the art. The pulses generated and emitted by the electronic circuitry 30 are applied to the electromagnetic valve 29, by way of a gate 31 which, in its simplest form, may be an AND gate. The intake manifold pressure is sensed through a sensor 32. The idling operation of the engine may be designated through a predetermined value of the pressure as sensed by the sensor 32. When the latter detects the idling operation of the engine through predetermined magnitude of the pressure within the intake manifold, an electronic counter 33 is actuated and set into operation, by being connected to the sensor 32. Once actuated, the electronic counter 33 emits an electrical signal after every succeeding injection process, for example, for the purpose of inhibiting transmission from the gate 31. Thus, the output of the counter 33 is connected to one of the inputs of the gate 31. With the operation of the electronic counter 33, in this manner, the subsequent injection process is suppressed.

In detailed operation of the internal combustion engine, a fresh supply of fuel-air mixture is sucked into the chamber 20 through the entrance opening 26 of the machine, in accordance with FIG. 2. The fuel-air mixture that had been sucked in, becomes compressed within the chamber 21, whereas burned or exhaust gases prevail within the chamber 22. In the diagram of FIG. 3, the position of the piston is such that fresh gas supply is still sucked into the chamber 20. The gases within the chamber 21 become severely compressed and become ignited through a spark of the spark plug 28. The burned or exhaust gases within the chamber 22 are ejected through the exit or exhaust opening 27.

In accordance with FIG. 4, fresh gas supply is still taken in or sucked into the chamber 20. Within the chamber 21, however, the ignited gas is expanded and drives the piston edge 13 of the piston 11. As a result, the drive shaft 24 of the internal combustion engine 10 is driven in the operating direction. Further exhaust gases are ejected through the exhaust or exit opening 27. In accordance with FIG. 5, the sucked-in or intake gases become compressed within the chamber 20. Within the chamber 21, gases which have been ignited are further expanded, and burned or exhaust gases prevail within the chamber 22. A portion of these exhaust or burned gases are not ejected, but, instead, remain within the space between the trochoid-shaped inner wall 16 and the piston edge 14. When, in this manner, fresh gas supply is taken in or sucked into the chamber 22, this fresh supply of fuel-air mixture is mixed with the burned or residual gases. When operating at low idling speed, a small charge of fuel-air mixture is sufficient. As a result, the amount of residual gas within the chamber 22 becomes of significant proportion in relation to the fresh mixture supply during idling operation. Therefore, when operating at idling speed, an undesirable relationship prevails between the fresh mixture supply and the residual gas. The unfavorable proportions of residual gas compared to the amount of fresh supply mixture, during idling, prevents the resulting mixture from being ignitable. As a consequence of this condition, unburned fuel-air mixture is ejected through the exhaust with the mixture of the residual or exhaust gases.

In order to realize complete combustion of the fresh fuel-air mixture, a scavenging or cleansing operation is carried out after every operational process during idling, in accordance with the present invention. Thus, when the piston in accordance with FIG. 5 continues to turn after concluding or terminating its operating cycle, the injection of fuel is inhibited through the electronic gate 31 which prevents the valve opening pulse emitted by the circuitry 30 from reaching the electromagnetically controlled valve 29. As a result, only fresh air is taken or sucked into the chamber 22, instead of the fuel-air mixture. This fresh air supply becomes mixed with the residual gases which still prevail within the chamber 22. After a rotation or turning of the piston 11, and when the edge 14 of the piston 11 lies across from the exit or exhaust opening 27, the residual gases which are considerably diluted with fresh air, become injected. In this manner, essentially only fresh air remains within the chamber 22. If, now, a fuel-air mixture is taken in or sucked into the chamber 22 again upon the next rotation of the piston 11, a satisfactory ignitable gas mixture is realized, even though the intake charge is of small quantity.

In accordance with the electronic gate 31 and inhibiting pulses transmitted by the counter 33, as described above, it is possible to provide, when required, a number of scavenging or cleansing operations between the combustion processes. Thus, such a plurality of scavenging operations may be realized directly from the circuitry shown without additional operating elements.

The interchange between combustion and scavenging or cleansing operation, as described above, also takes place within the remaining chambers 20 and 21. These same processes which are described here in relation to a rotation or turning piston internal combustion engine, may be also applied in principle to a reciprocating piston internal combustion engine.

The electronic gate circuitry 31 becomes actuated with inhibiting pulses only during idling operation or low load regions. Accordingly, the gate feeding circuitry 33 must be actuated in accordance with a parameter which is characteristic of idling operation or low load operation. Since the pressure within the intake manifold is characteristic of such operation conditions, a pressure sensor 32 actuates directly the inhibiting pulse emitter or counter 33 through signals transmitted from the pressure detecting sensor.

It will be understood that each of the elements described above, or two or more together, may also find a useful application in other types of constructions differing from the types described above.

While the invention has been illustrated and described as embodied in a fuel injection arrangement for internal combustion engines, it is not intended to be limited to the details shown, since various modifications and structural changes may be made without departing in any way from the spirit of the present invention.

What I claim as new and desire to be protected by Letters Patent is set forth in the appended claims:

1. An internal combustion engine comprising, in combination, a housing; piston means movable within said housing and forming a combustion chamber; air supply means for supplying air to said combustion chamber; fuel injection means for injecting fuel into said chamber to be intermixed with said air when actuated by an electrical pulse; pulse emitting means connected to said fuel injection means and applying pulses to said injection means; and electronic pulse-inhibiting means connected between said fuel-injecting means and said pulse emitting means for inhibiting the application of a pulse to said fuel injection means for at least every second fuel injection process during idling of said engine, so that the fuel-free air within said chamber upon inhibiting injection of fuel into said chamber scavenges and cleanses said chamber.

2. The internal combustion engine as defined in claim 1 wherein said pulse-inhibiting means comprises an electronic gate for gating and inhibiting the transmission of said pulses from said pulse-emitting means to said fuel-injecting means for at least every second fuel injection process during idling of said engine.

3. The internal combustion engine as defined in claim 1 wherein said piston means comprises a rotatable piston with three triangle convex-shaped sides.

4. The internal combustion engine as defined in claim 1 including pressure-sensing means for sensing the air pressure within said air supply means and controlling said pulse-inhibiting means as a function of the pressure within said air supply means.

5. The internal combustion engine as defined in claim 4 wherein said pulse-inhibiting means comprises an electronic counter connected to said pressure-sensing means and actuated by a signal from said pressure-sensing means; and pulse-gating means connected to the output of said counter means and to said pulse-emitting means for inhibiting the transmission of pulses from said pulse-emitting means to said fuel-injecting means for at least every second fuel injection process during idling of said engine.

6. The internal combustion engine as defined in claim 5 wherein said gating means comprises an AND gate.

7. The internal combustion engine as defined in claim 5 wherein said gating means comprises an AND gate having one input connected to the output of said electronic counter means and a second input connected to the output of said pulse emitting means, the output of said gating means being connected to said fuel-injecting means.

8. The internal combustion engine as defined in claim 1 including pressure-sensing means within said air supply means and connected to said pulse inhibiting means for inhibiting the transmission of pulses from said pulse emitting means to said fuel injecting means when the air pressure within said air supply means is within a predetermined pressure region.

9. The internal combustion engine as defined in claim 1, wherein said housing has an inner surface of substantially oval shape and wherein said piston means comprises a piston rotatably arranged within said housing and having circumferentially spaced surface portions engaging said inner surface of said housing.